Patented May 26, 1953

2,640,058

UNITED STATES PATENT OFFICE 2,640,058

HYDROXYALKYL-SUBSTITUTED TOCOPHEROLS

Leonard Weisler, Rochester, N. Y., assignor, by mesne assignments, to Eastman Kodak Company, Rochester, N. Y., a corporation of New Jersey No Drawing. Original application October 8, 1949, Serial No. 120,411. Divided and this application September 13, 1951, Serial No. 246,511

7 Claims. (Cl. 260—345.5)

This invention relates to the treatment of vitamin E-active material and is particularly concerned with enhancing the vitamin E biological activity of tocopherols having relatively lower potency than alpha-tocopherol.

Tocopherols are materials found in nature, particularly in vegetable oils such as soybean oil, wheatgerm oil, cottonseed oil and the like, and exhibiting vitamin E biological activity. Four tocopherols have been discovered in nature and are designated respectively as alpha-, beta-, gamma- and delta-tocopherol. Of these tocopherols, alpha-tocopherol exhibits the highest degree of vitamin E biological activity, both in the form of the free tocopherol and as the ester; the esters of the tocopherols being readily prepared by esterification of the free tocopherol by well-known methods such as by treatment with acid halides and the like.

The tocopherols other than alpha-tocopherol are characterized by having at least one aromatic hydrogen atom on the benzenoid nucleus. Thus gamma-tocopherol is characterized by having an aromatic hydrogen atom in the 5 position on the nucleus ortho to the hydroxyl group which is in the 6 position on the nucleus. Beta-tocopherol has an aromatic hydrogen in the 7 position on the nucleus, and delta-tocopherol has aromatic hydrogen atoms in the 5 and 7 positions on the nucleus. The structural formulas for gamma-, beta- and delta-tocopherol respectively are as follows:

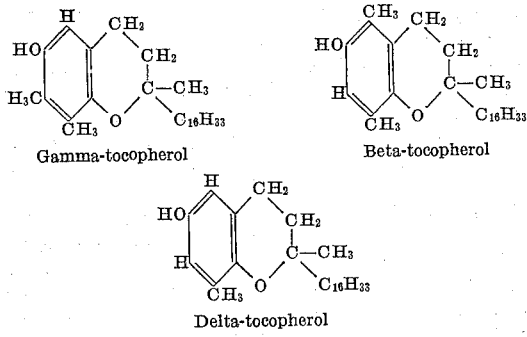

Gamma-tocopherol    Beta-tocopherol

Delta-tocopherol

These tocopherol materials exhibit relatively lower vitamin E activity than alpha-tocopherol in both free and esterified form, esterification being effective to introduce an acyl group such as the palmitate or acetate group in the position normally occupied by the hydroxyl group on the nucleus. The non-alpha tocopherols having a hydroxy group ortho to the aromatic hydrogen atom are normally resistant to direct alkylation in the position occupied by the aromatic hydrogen atom or atoms. The lower potency tocopherols occur naturally in substantial amounts particularly in vegetable oils and it is therefore desirable to increase the available quantity of vitamin E-active material by enhancing the vitamin E biological activity of tocopherol material having relatively lower potency than alpha-tocopherol.

It is therefore an object of this invention to provide a new and useful method of enhancing the vitamin E biological activity of tocopherol material normally possessing relatively lower vitamin E activity.

It is a further object of the invention to provide a method of converting tocopherols other than alpha-tocopherol to alpha-tocopherol in good yield.

It is another object of the invention to provide an economically feasible method of introducing at least one methyl group on the nucleus of a tocopherol normally having at least one aromatic hydrogen atom on the benzenoid nucleus.

Another object of the invention is to provide new vitamin E intermediates.

Another object of the invention is to provide hydroxy-methylated tocopherol material which is readily reducible to alpha-tocopherol.

Another object of the invention is to provide a new and improved method of introducing methyl groups as substituents on a benzenoid nucleus ortho to a hydroxyl group.

Another object of the invention is to enhance the vitamin E biological activity of beta-, gamma- and delta-tocopherols.

Other objects will be apparent from the description and claims which follow.

These and other objects are attained in accordance with this invention by replacing an aromatic hydrogen atom on the nucleus of tocopherol material with a hydroxyalkyl group and reducing the resulting substituent hydroxyalkyl group to the corresponding alkyl group.

Hydroxyalkylation is carried out in accordance with this invention by reacting tocopherol material characterized by having at least one aromatic hydrogen atom on the nucleus with an alkyl aldehyde in the presence of an alkaline material whereby a hydroxyalkyl group substitutes on the nucleus for at least one such aromatic hydrogen atom. When the tocopherol material being treated is gamma-tocopherol, substitution is in the 5 position on the nucleus to form 5-hydroxyalkyl gamma-tocopherol. With beta-tocopherol, the substituted derivative is 7-hydroxyalkyl beta-tocopherol. Delta-tocopherol has aromatic hydrogen atoms in both the 5 and 7 positions on the nucleus and treatment of delta-tocopherol in accordance with this invention usually results in a mixture of 5-hydroxyalkyl delta-tocopherol and 5,7-hydroxyalkyl delta-tocopherol.

The hydroxyalkyl-substituted tocopherols are readily reduced to the corresponding alkyl substituted tocopherols by the Clemmensen procedure, by zinc dust and hydrochloric acid, by catalytic hydrogenation under moderate pressure, such as 50 lbs. pressure, using a hydrogenation catalyst such as nickel or palladium, or by similar reduction procedure. When the substituent hydroxyalkyl group is a hydroxymethyl group, the reduction of 5-hydroxymethyl gamma-tocopherol; 7-hydroxymethyl beta-tocopherol or 5,7-hydroxymethyl delta-tocopherol yields alpha-tocopherol having substantially greater vitamin E biological activity than the original tocopherol being treated.

The invention is applicable for treating tocopherol material characterized by having at least one aromatic hydrogen atom on the benzenoid nucleus. It is particularly applicable for the treatment of beta-, gamma- and delta-tocopherols either alone or in admixture with each other. In commercial practice, the process of the invention is ordinarily used to treat mixtures of tocopherols as obtained from vegetable oils or other sources.

The mixtures of naturally-occurring tocopherols are preferably treated in the form of a concentrate. Thus in the case of vegetable oil tocopherols, the concentrate of tocopherols material is obtained from the vegetable oil by such methods as high vacuum unobstructed path distillation, saponification, selective adsorption, solvent extraction, or the like as well as combinations of these and other methods. The concentrate obtained thereby contains a high percentage of mixed tocopherols.

The tocopherol material being treated can also be obtained from sources other than directly from vegetable oils. Thus the tocopherol material obtained by solvent extraction or high vacuum distillation of deodorizer sludge is eminently suitable. Likewise synthetically prepared material can be treated in accordance with the invention.

Hydroxyalkylation in accordance with this invention is preferably carried out with the tocopherol material dissolved in an organic solvent. The solvent employed is not critical since it serves only as a vehicle and suitable solvents include aliphatic alcohols such as methanol, ethanol, propanol and the like, glycols such as ethylene glycol and the like, ethers such as methyl ether, ethyl ether and the like, dioxane, hydrocarbons such as naphtha, hexane and the like, and similar well-known organic solvents.

The hydroxyalkylation is effected in the solvent medium by reacting the tocopherol material with an aldehyde in the presence of an alkaline material. The aldehyde employed will depend upon the substituent group desired. Any of the alkyl aldehydes can be used although the lower alkyl aldehydes are preferably employed such as formaldehyde, acetaldehyde, propionaldehyde and butyraldehyde. For hydroxymethylation, formaldehyde is employed, the formaldehyde being furnished by formaldehyde itself, preferably as aqueous formalin, or by a polymer of formaldehyde such as paraformaldehyde or by a material furnishing formaldehyde under the conditions of reaction. Acetaldehyde is employed for introducing a substituent hydroxyethyl group on the tocopherol nucleus and the higher aldehydes for furnishing correspondingly higher alkyl groups. For conversion of tocopherol material to alpha-tocopherol, formaldehyde or a formaldehyde-bearing material is employed.

The hydroxyalkylation is effected by use of an alkaline material in conjunction with the aldehyde. Any of the alkaline materials which produce hydroxyl ions in aqueous solution can be used, and the alkaline materials which are suitably employed in practising the invention include free bases, alkaline salts and oxides, and basic alcoholates. Suitable alkaline catalysts include sodium hydroxide, potassium hydroxide, lithium hydroxide, zinc oxide, calcium oxide, barium carbonate, potassium carbonate, sodium carbonate, sodium ethylate, potassium ethylate, calcium hydroxide and similar well-known alkaline materials.

The hydroxyalkylation reaction is carried out under an inert atmosphere for best results, this condition being readily accomplished by bubbling nitrogen or similar inert gas through the reaction mixture during the hydroxyalkylation reaction. The reaction is desirably carried out with heating to shorten the reaction interval, temperatures at or below the reflux temperature of the solvent vehicle being ordinarily employed.

As set out hereinabove, the hydroxyalkyl derivatives are readily reduced to the corresponding alkyl derivatives by well-known reduction procedures. The reduction is conveniently effected by means of zinc dust and hydrochloric acid in ether solution although the reduction procedure can be varied in accordance with other known practices.

A typical commercial preparation of a tocopherol concentrate of high vitamin E potency is exemplified by the treatment of soybean tocopherols. Soybean oil is obtained by solvent extraction of soybeans, as for example by means of hexane, and the solvent is removed by evaporation. The soybean oil is then concentrated by chromatographic adsorption or preferably by high vacuum distillation. In concentration by high vacuum distillation, the soybean oil is caused to flow over the vaporizer surface of a flowing film high vacuum still such as a falling-film still or a centrifugal still. The distillation pressure normally employed in such distillation is below 1 mm. and preferably below 0.1 mm., such as 0.01 to 0.001 mm. for example. The distillation temperature is preferably in the range between about 150° C. and 250° C. The tocopherol content of the soybean oil distills in the first fractions and it is preferably recovered as a relatively narrow cut of distillate amounting to about 1–10% of the oil to minimize thermal hazard during distillation.

The resulting concentrate of tocopherol material includes alpha-tocopherol, gamma-tocopherol and delta-tocopherol in about the ratio of 10:60:30, and the biological potency of the concentrate is then increased by treatment in accordance with this invention. If desired, the alpha-tocopherol can be separated from the concentrate prior to treatment of the non-alpha tocopherols but this is not necessary since the alpha-tocopherol is unaffected by the treatment.

In carrying out the process of this invention, the concentrate of tocopherol material is dissolved in an organic solvent, such as ethanol, containing about 0.1% to 2% by weight or more of an alkaline material such as sodium hydroxide. The mixture is heated and nitrogen is bubbled through it while a suitable aldehyde, such as formaldehyde, is added to the solution and the heating is continued for one-half to three hours to form hydroxymethyl derivatives of the non-alpha tocopherols. The hydroxymethyl derivatives can thereafter be reduced in the reaction mixture or extracted with ether and reduced in ethereal solution as desired. Reduction is effected by the addition to the hydroxymethyl derivatives of zinc dust and a mineral acid such as hydrochloric acid. The resulting tocopherol concentrate has an enhanced vitamin E biological activity as measured by the resorption sterility test in rats, as much as fifty percent or more of the non-alpha tocopherols having been concerted to alpha-tocopherol. Under usual reaction conditions, a portion of the delta-tocopherol undergoes single addition in the 5 position on the nucleus to yield beta-tocopherol in the product. By repeating the hydroxymethylation and reduction on this product, a substantial portion of this beta-tocopherol is converted to alpha-tocopherol and the vitamin E potency of the concentrate is further enhanced.

The process embodying this invention is applicable for treating any of the tocopherols having an aromatic hydrogen atom on the nucleus and including beta-, gamma-, and delta-tocopherols either alone or in admixtures such as the mixture of gamma- and delta-tocopherol with alpha-tocopherol in soybean oil concentrate as set out hereinabove, mixtures of beta- and alpha-tocopherol as in the retreatment of the product obtained by treatment of soybean concentrate or in the treatment of wheat germ oil, and other such mixtures. If it is desired to treat a single tocopherol, it can be prepared synthetically by the condensation of phytol with a methyl substituted hydroguinone. A mixture of gamma- and delta-tocopherols can be separated from soybean or other vegetable oil by chromatographic adsorption and the delta-tocopherol separated from the gamma-tocopherol by esterification and fractional crystallization to obtain concentrates of the individual tocopherols. Pure beta-tocopherol can be separated from wheat germ oil containing the beta-tocopherol admixed with alpha-tocopherol. Although the process embodying the invention is equally applicable for treating any of these tocopherol materials, certain preferred embodiments will be set out in detail for purposes of illustration.

*Example*

Two grams of a gamma-tocopherol concentrate, comprising 72.5% total tocopherol, of which 92.5% is non-alpha tocopherol, are dissolved in 20 ml. of ethanol containing 0.1 g. of potassium hydroxide, the solution being put into a reaction flask fitted with a side arm and a reflux condenser. The solution is heated to 60° C. and while at that temperature and with nitrogen bubbling through the solution, 2.0 ml. of formalin (25% aqueous solution of formaldehyde) are added. The mixture is maintained at 60° C. under nitrogen for 135 minutes to cause hydroxymethylation of the gamma-tocopherol in the 5 position on the nucleus. The reaction mixture is then extracted with ether, the ether extract washed to neutrality and dried over sodium sulfate, and the ether removed by evaporation. The 5-hydroxymethyl gamma-tocopherol thus obtained, amounting to 2.2 g., has 57.7% total tocopherol content by Emmerie-Engel assay, representing a yield of 88%. The product oil has $$E^{1\%}_{1\,cm.}(298\ m\mu) = 63.3$$

The 5-hydroxymethyl gamma-tocopherol concentrate is then dissolved in isopropyl ether, zinc dust and concentrated hydrochloric acid are added and the mixture warmed at 45° C. for 2 hours to effect reduction of the substituent hydroxymethyl group to a methyl group. The mixture is then extracted with ether, the ether extract washed to neutrality and the ether removed by evaporation. The resulting oily concentrate of alpha-tocopherol has $$E^{1\%}_{1\,cm.}(294\ m\mu) = 61.2$$

and an assay of 58% total tocopherols with the yield of alpha-tocopherol being 79%.

Using acetaldehyde in the above process instead of formaldehyde a concentrate of 5-ethyl gamma-tocopherol is obtained. Higher alkyl derivatives are obtained using higher alkyl aldehydes.

Similar results are obtained by substituting other alkaline materials in the process. Thus sodium hydroxide and potassium carbonate, for example, do not materially alter the course of the reaction.

Delta-tocopherol and beta-tocopherol respectively are treated in similar manner in accordance with the invention. Using formaldehyde, beta-tocopherol is converted to 7-hydroxymethyl beta-tocopherol which is reduced by catalytic hydrogenation to alpha-tocopherol. Delta-tocopherol yields a mixture of the 5- and 5,7-hydroxymethyl derivatives which upon reduction give a mixture of beta-tocopherol and alpha-tocopherol. Higher alkyl derivatives of beta- and delta-tocopherol are prepared in like manner using other alkyl aldehydes. The hydroxyalkyl derivatives embodying the invention are structurally represented by the formula

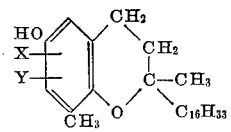

wherein X is either hydrogen, a methyl group or a hydroxyalkyl group and Y is a hydroxyalkyl group.

The invention thus provides a simple and commercially feasible method of enhancing the vitamin E biological activity of tocopherols normally possessing relatively lower vitamin E biological activity. It is applicable for treating beta-, gamma- and delta-tocopherols either alone or in admixture with each other and/or alpha-tocopherol. The method embodying the invention is especially useful for treating concentrates of naturally-occurring tocopherols and thereby makes available large amounts of highly active material. Alkylation of the tocopherols is accomplished in accordance with this invention without substantial destruction or polymerization of the tocopherols normally attendant to attempted direct alkylation of benzenoid compounds in a position ortho to a nuclear hydroxyl group. The method embodying the invention effects conversion in good yield without the necessity of elaborate precautions being taken.

While the invention has been described in considerable detail with reference to certain preferred embodiments, it will be understood that variations and modifications can be effected without departing from the spirit and scope of the invention as described herein and as defined in the appended claims.

This application is a division of my application Serial No. 120,411 filed October 8, 1949, and copending herewith.

I claim:

1. As a new chemical compound, a hydroxyalkylated tocopherol having the formula

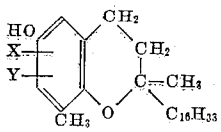

wherein X is a member selected from the class consisting of hydrogen, methyl groups and lower hydroxyalkyl groups; and Y is a lower hydroxyalkyl group.

2. As a new chemical compound, a hydroxyalkylated tocopherol having the formula

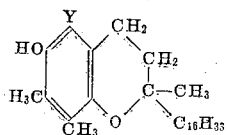

wherein Y is a lower hydroxyalkyl group.

3. As a new chemical compound, a hydroxyalkylated tocopherol having the formula

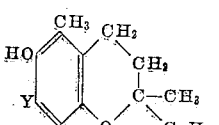

wherein Y is a lower hydroxyalkyl group.

4. As a new chemical compound, a hydroxyalkylated tocopherol having the formula

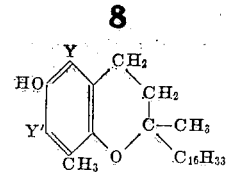

wherein Y and Y' are lower hydroxyalkyl groups.

5. As a new chemical compound, a nuclearly-substituted tocopherol having the formula

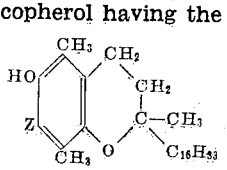

wherein Z is a hydroxymethyl group.

6. As a new chemical compound, a nuclearly-substituted tocopherol having the formula

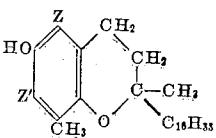

wherein Z is a hydroxymethyl group.

7. As a new chemical compound, a nuclearly-substituted tocopherol having the formula wherein Z and Z' are hydroxymethyl groups.

LEONARD WEISLER.

No references cited.